US012645447B2

(12) United States Patent
Yang et al.

(10) Patent No.: US 12,645,447 B2
(45) Date of Patent: Jun. 2, 2026

(54) METHODS AND SYSTEMS FOR DEPLOYING SOFTWARE UPDATE

(71) Applicant: Hand Held Products, Inc., Charlotte, NC (US)

(72) Inventors: Shanning Yang, Charlotte, NC (US); Hua Zhang, Charlotte, NC (US); Shangfei Tang, Charlotte, NC (US); Yaqing Lu, Charlotte, NC (US)

(73) Assignee: Hand Held Products, Inc., Charlotte, NC (US)

( * ) Notice: Subject to any disclaimer, the term of this patent is extended or adjusted under 35 U.S.C. 154(b) by 291 days.

(21) Appl. No.: 18/476,465

(22) Filed: Sep. 28, 2023

(65) Prior Publication Data

US 2024/0126533 A1     Apr. 18, 2024

(30) Foreign Application Priority Data

Oct. 18, 2022     (CN) ......................... 202211271532.X

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
CPC .......... G06F 8/65; G06F 8/71; G06F 9/44505
See application file for complete search history.

(56) References Cited

U.S. PATENT DOCUMENTS

| | | | | |
|---|---|---|---|---|
| 2007/0038991 A1* | 2/2007 | Schuft | ....................... | G06F 8/65 |
| | | | | 717/172 |
| 2015/0178064 A1* | 6/2015 | Cairns | ....................... | G06F 8/65 |
| | | | | 717/171 |
| 2016/0013934 A1* | 1/2016 | Smereka | ............... | H04L 9/0891 |
| | | | | 713/171 |

(Continued)

FOREIGN PATENT DOCUMENTS

| | | | | | |
|---|---|---|---|---|---|
| CN | 114138317 A | * | 3/2022 | ............. | G06F 8/658 |
| CN | 114968315 A | * | 8/2022 | ............... | G06F 8/65 |

(Continued)

OTHER PUBLICATIONS

Android, "Mainline", retrieved from the Internet at URL: <https://source.android.com/devices/architecture/modular-system> on Mar. 21, 2024, 3 pages.

(Continued)

*Primary Examiner* — Daxin Wu
(74) *Attorney, Agent, or Firm* — Alston & Bird LLP

(57) ABSTRACT

A computing device and methods for deploying a software update to the computing device are provided. The method for deploying the software update by a high-level operating system (HLOS) processor includes receiving, by the HLOS processor, the software update request; updating a code package of the HLOS processor; and transmitting, by the code package, a software update to a shared file system, where the shared file system is shared between the HLOS processor and a software stack of a modem processor, and the software update is configured to cause the modem processor to deploy the software update to the software stack of the modem processor in an instance in which a file change is detected in the shared file system.

19 Claims, 9 Drawing Sheets

(56) References Cited

U.S. PATENT DOCUMENTS

| | | | | |
|---|---|---|---|---|
| 2018/0052677 | A1* | 2/2018 | Lodeiro ................... | G06F 8/65 |
| 2022/0066766 | A1* | 3/2022 | Mysore Shantamurthy ............... | |
| | | | | G06F 9/4416 |
| 2023/0153107 | A1* | 5/2023 | Chen ........................ | G06F 8/65 |
| | | | | 717/169 |
| 2023/0418584 | A1* | 12/2023 | Huang ................. | G06F 11/076 |
| 2024/0012652 | A1* | 1/2024 | Wang ........................ | G06F 8/65 |
| 2024/0106696 | A1* | 3/2024 | Ovadia .............. | H04L 25/0212 |
| 2024/0220226 | A1* | 7/2024 | Wang ..................... | G06F 8/658 |

FOREIGN PATENT DOCUMENTS

| | | | | | |
|---|---|---|---|---|---|
| CN | 114153483 | B | * | 10/2024 | ............... G06F 8/71 |
| WO | WO-2013114317 | A1 | * | 8/2013 | ............... G06F 8/66 |

OTHER PUBLICATIONS

Android, "Wi-Fi", retrieved from the Internet at URL: <https://source.android.com/devices/architecture/modular-system/wifi> on Mar. 21, 2024, 7 pages.

* cited by examiner

<u>700</u>

RECEIVE A SOFTWARE UPDATE REQUEST FROM A CLIENT TERMINAL AND SEND THE SOFTWARE UPDATE REQUEST TO A CLIENT COMPUTING DEVICE — 702

SEND A SOFTWARE UPDATE TO A CLIENT COMPUTING DEVICE ACCORDING TO THE SOFTWARE UPDATE REQUEST — 704

METHODS AND SYSTEMS FOR DEPLOYING SOFTWARE UPDATE

CROSS-REFERENCE TO RELATED APPLICATIONS

This application claims priority pursuant to 35 U.S.C. 119(a) to Chinese Application No. 202211271532.X, filed Oct. 18, 2022, which application is incorporated herein by reference in its entirety.

FIELD OF THE INVENTION

Example embodiments of the present disclosure relate generally to building and deploying software update, and more particularly, to methods and systems for building and deploying software update for android device.

BACKGROUND

Mobile client computing devices with wireless wide area network (WWAN) modems usually have separate processors for the high-level Operating System (HLOS) and the modem software stack. Stability of the HLOS is very important, in some examples, for customers, especially for business customers whose production software applications are deployed with one Operating System (OS) version which have been verified. A full installation of Operating System image package for the mobile client computing device contains, in some examples, both the HLOS image and the modem image. In some examples, urgent modem issues may arise unexpectedly and need to be fixed as soon as possible, and the urgent modem issues may be resolved by modifying the configuration and the features of the modem. Through applied effort, ingenuity, and innovation, Applicant has solved problems relating to open path detector systems by developing solutions embodied in the present disclosure, which are described in detail below.

BRIEF SUMMARY

Various embodiments described herein relate to methods, and systems for deploying a software update to a client computing device.

In accordance with various embodiments of the present disclosure, a method for deploying a software update is provided. The method for deploying the software update by a high-level operating system (HLOS) processor includes receiving, by the HLOS processor, a software update request; updating a code package of the HLOS processor; and transmitting, by the code package, a software update to a shared file system, where the shared file system is shared between the HLOS processor and a software stack of a modem processor, and the software update is configured to cause the modem processor to deploy the software update to the software stack of the modem processor in an instance in which a file change is detected in the shared file system.

In some embodiments, updating the code package of the HLOS processor includes: receiving an update of the code package of the HLOS processor; and modifying the code package of the HLOS processor according to the update of the code package.

In some embodiments, the software update includes a name of a configuration, values of the configuration, and a type of the configuration to be applied in the software stack for a carrier or a radio access type network, and the file change in the shared file system includes a change of the name of the configuration, a change of the values of the configuration, and a change of the type of the configuration.

In some embodiments, the type of the configuration is a persistent configuration or a runtime configuration.

In some embodiments, to deploy the software update to the software stack of the modem processor, the software stack of the modem processor is caused to read, by a software update handler of the modem processor, the software update from the shared file system; and apply the name of the configuration, the values of the configuration, and the type of the configuration to a corresponding protocol stack of the software stack.

In some embodiments, the software update handler is configured to start after the shared file system is started and before the software stack of the modem processor is started.

In some embodiments, the software update request is a request for a firmware update.

In some embodiments, the method further includes maintaining, by the code package, a list of software updates with corresponding version numbers; and deleting files of the software update that are not required by the modem processor.

In some embodiments, a file type of the files of the software update is extensible markup language (XML) or JavaScript Object Notation (JSON).

According to another embodiment, a method for deploying a software update is provided. The method for deploying a software update by a modem processor includes: monitoring files of the software update in a shared file system, where the shared file system is shared between a high-level operating system (HLOS) processor and a software stack of the modem processor, and the HLOS processor is configured to transmit, by a code package of the HLOS processor, a software update to the shared file system in an instance in which a code package of the HLOS processor is updated; determining whether a file change is detected in the shared file system; and deploying the software update to the software stack of the modem processor in an instance in which a file change is detected in the shared file system.

In some embodiments, the software update includes a name of a configuration, values of the configuration, and a type of the configuration to be applied in the software stack for a carrier or a radio access type network, and a file change in the shared file system includes a change of the name of the configuration, a change of the values of the configuration, and a change of the type of the configuration.

In some embodiments, the type of the configuration is a persistent configuration or a runtime configuration.

In some embodiments, deploying the software update to the software stack of the modem processor includes: reading, by a software update handler of the modem processor, the software update from the shared file system; and applying the name of the configuration, the values of the configuration, and the type of the configuration to a corresponding protocol stack of the software stack.

In some embodiments, the software update handler is configured to start after the shared file system is started and before the software stack of the modem processor is started.

According to another embodiment, a computing device for deploying a software update to the client computing device is provided. The computing device includes a high-level operating system (HLOS) processor and a memory storing instructions, when the instructions executed, the HLOS processor is configured to: receive, by the HLOS processor, a software update request; update a code package of the HLOS processor; and transmit, by the code package, a software update to a shared file system, where the shared file system is shared between the HLOS processor and a software stack of a modem processor, and the modem processor is configured to cause the software stack of the modem processor to deploy the software update to the software stack of the modem processor in an instance in which a file change is detected in the shared file system.

In some embodiments, to update the code package of the HLOS processor, the HLOS process is configured to: receive an update of the code package of the HLOS processor; and modify the code package of the HLOS processor according to the update of the code package.

In some embodiments, the software update includes a name of a configuration, values of the configuration, and a type of the configuration to be applied in the software stack for a carrier or a radio access type network, and a file change in the shared file system includes a change of the name of the configuration, a change of the values of the configuration, and a change of the type of the configuration.

In some embodiments, the type of the configuration is a persistent configuration or a runtime configuration.

In some embodiments, to deploy the software update to the software stack of the modem processor, the modem processor is configure to: read, by a software update handler of the modem, the software update from the shared file system; and apply the name of the configuration, the values of the configuration, and the type of the configuration to a corresponding protocol stack of the software stack.

In some embodiments, the software update handler is configured to start after the shared file system is started and before the software stack of the modem is started.

Systems and method corresponding to the above-summarized embodiments are also described and claimed herein.

Additional features and advantages are realized through the techniques of the present disclosure. Other embodiments and aspects of the disclosure are described in detail herein and are considered a part of the claimed disclosure. For a better understanding of the disclosure with advantages and features, refer to the description and to the drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

Figure 1:
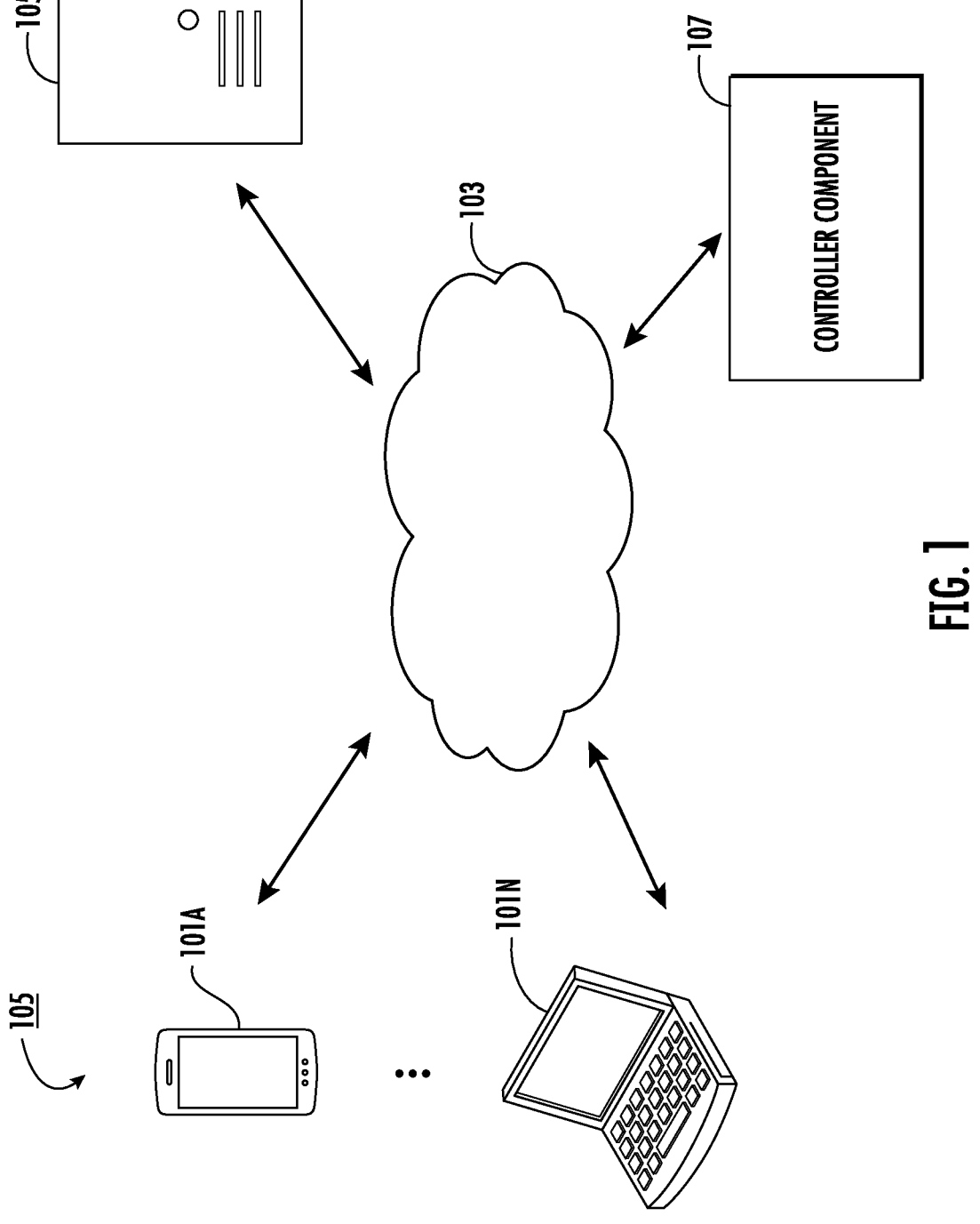
FIG. 1 illustrates an example system for deploying a software update to a client computing device in accordance with various embodiments of the present disclosure.

The detailed description explains the preferred embodiments of the disclosure, together with advantages and features, by way of example with reference to the drawings.

DETAILED DESCRIPTION OF THE INVENTION

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "in some embodiments," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might"

(or other such language) be included or have a characteristic, that a specific component or feature is not required to be included or to have the characteristic. Such a component or feature may be optionally included in some embodiments, or it may be excluded.

In some examples and in an instance in which a modem is to be updated, the modem update (e.g., a modem image) alone cannot be deployed to the mobile client computing device in some examples. Instead, the modem image needs to be built into a new Operating System image. However, in some examples, the publication and release of the new Operating System image may require lab testing (e.g., Google Mobile Service (GMS) test) and certification prior to release. Historically, and in some examples, this process may take considerable time, which may cause a lot of inconvenience to the customer who is waiting for an update to a modem or other component operating on the mobile device.

In some examples, the process for updating a modem or other hardware operating on a mobile device includes, but is not limited to a software update request that is received by a client computing device. In particular, the software update request may be a software update request in the form of a hotfix, a security fix, a patch, or the like. In some examples, the software update request is for a modem (e.g., a modem update request).

In some examples, the modem software may be modified according to the received software update request. In order to modify the modem software, a new modem image may be built according to the modified modem software. Once built, a new Operating System (OS) image may be built to include the new modem image. The new Operating System image may be tested and may, in some examples, need to be certified (e.g., GMS test and certification) before being released to the client. Even after releasing the new Operating System to the client, further testing of the new Operating System may be needed in some examples. After the new Operating System is certified, the new Operating System image may be sent to the client. The client may then choose to upgrade its current Operating System with the new version of Operating System. In some examples, the client may experience an outage during the process and the outage may impact their business.

The systems and method described herein, in some examples, enable software updates of low-level modules of a high-level Operating System (HLOS) outside of a normal system release cycle. In some examples, a HLOS may take the form of a set of software that manages hardware resources on a mobile device, provides common services to applications on an application layer, and/or performs high-level functions and operations for the client computing device. In some examples, an embedded Operating System that is identical or similar to a desktop Operating System. In further examples, the HLOS may be developed and tested in the desktop environment, which need a final integration phase on the embedded hardware. An important benefit of the HLOS, in some examples, is that a software update can be quickly installed on the hardware. For example, the native kernel libraries or java libraries may be upgraded without complete installation of a new version of Operating System. Indeed, in accordance with various examples of the present disclosure, methods and systems for deploying the software update to a client computing device are disclosed below.

In some examples, the software update may include the transmission of a code package to client computing device. In some examples, the code package may enable the upgrade of low level modules of HLOS (e.g., native kernel libraries or framework java libraries). In some examples, the code package is native kernel libraries or Android framework java libraries. In yet further examples, the code package may take the form of Android Pony EXpress (APEX) and/or a modem APEX module.

In further examples, the software update described herein may enable or otherwise include a hotfix to the modem software stack. In such examples, a modem APEX module running in HLOS may be developed and, in some examples, will allow the modem to be upgraded with the code package. In some examples, the configurations that are installed as part of the code package installed as a software update to a shared file system will be deployed to modem software stack immediately or take effect at next power cycle.

In some examples, the hotfix described herein may be an xml file format, a j son file format, or the like. In some examples, hotfix files contain the configuration name and values to be applied in modem software stack, for a specific carrier, or for a specific radio access type. In some examples, the hotfix files may have configurations, such as persistent or runtime. In further examples, the hotfix files may be extracted to shared file system when the software update (e.g., modem APEX modules) is installed.

In some examples, the software update having the hotfix may be installed in the client computing device after a file system, such as a modem file system a share file system are ready. In some example, the install may be started before other Wireless wide area network (WWAN) protocol stacks. In particular, WWAN protocol stacks are implementations of a computer network that covers a large geographical area consisting of two or more LANs or MANs, by which two parties may be connected and communicate with each other wirelessly. In further examples, the hotfix may be read from the shared file system and the persistent configuration may be written to modem file system as Encrypting File System (EFS) files or Non-Volatile File System (NVFS) files. In particular, EFS provides filesystem-level encryption, which enables files to be transparently encrypted to protect confidential data from attackers with physical access to the client computing device, and NVFS is a file system designed to keep all information safe even if the battery run out of power. In further examples, the hotfix may be read from the shared file system and the runtime configuration may be applied to corresponding WWAN protocol stacks as runtime variables.

Referring now to FIG. 1, an example diagram illustrating an example system 100 for deploying a software update to a client computing device in accordance with some example embodiments described herein is provided. As shown in FIG. 1, the example system 100 comprises apparatuses, devices, and components such as, but not limited to, a controller component 107, one or more client computing devices 101A . . . 101N, a remote computing server 105 in a remote computing platform, and one or more networks 103.

In some embodiments, each of the components of the example system 100 may be in electronic communication with, for example, one another over the same or different wireless or wired networks 103 including, for example, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, stand-alone entities, the various embodiments are not limited to this particular architecture.

For example, the controller component 107, one or more client computing devices 101A . . . 101N, and the remote computing server 105 in the remote computing platform may be in electronic communication with one another to exchange data and information. As described herein, the controller component 107 may receive update data from one or more vendors of the modem devices. In some embodiments, the controller component 107 may transmit data from the one or more vendors to the one or more client computing devices 101A . . . 101N and/or the remote computing server 105 in the remote computing platform for updating the system.

In some embodiments, the one or more client computing devices 101A. 101N and/or the remote computing server 105 in the remote computing platform may receive the update data from the controller component 107 and may generate a request to deploy a hotfix to the modem. For example, the controller component 107 may transmit data to the one or more client computing devices 101A . . . 101N and/or the remote computing server 105. Upon receiving the data, the one or more client computing devices 101A . . . 101N and/or the remote computing server 105 may process the estimated characteristics data for rendering on a graphical user interface ("GUI"). In some embodiments, the one or more client computing devices 101A . . . 101N and/or the remote computing server 105 may generate one or more data points on the GUI based on the data in accordance with various example methods described herein.

Figure 2:
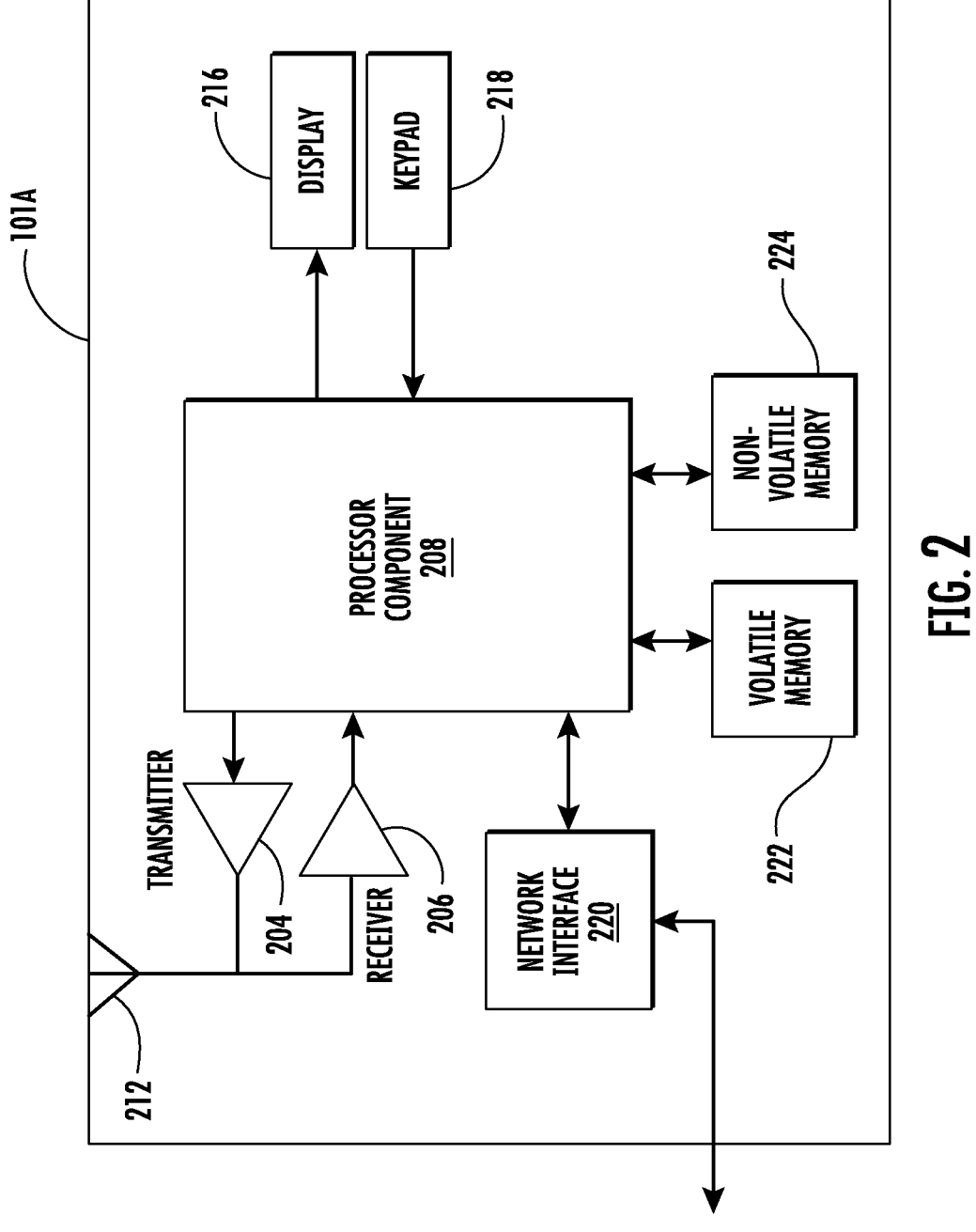
FIG. 2, illustrates an example schematic representation of an example client computing device in accordance with some example embodiments.

Referring now to FIG. 2, an example schematic representation of an example client computing device in accordance with some example embodiments described herein is provided. For example, FIG. 2 provides an illustrative schematic representative of one of the client computing devices 101A to 101N that can be used in conjunction with embodiments of the present disclosure. In some embodiments, as illustrated in FIG. 2, the client computing device 101A includes an antenna 212, a transmitter 204 (e.g., radio), a receiver 206 (e.g., radio), and a processor component 208 that provides signals to and receives signals from the transmitter 204 and receiver 206, respectively. The signals provided to and received from the transmitter 204 and the receiver 206, respectively, may include update data in accordance with an air interface standard of applicable wireless systems to communicate with various entities, such as a remote computing server 105, another client computing device 101A, an example monitoring system and/or the like. In this regard, the client computing device 101A may be capable of operating with one or more air interface standards, communication protocols, modulation types, and access types. More particularly, the client computing device 101A may comprise a network interface 220, and may operate in accordance with any of a number of wireless communication standards and protocols. In a particular embodiment, the client computing device 101A may operate in accordance with multiple wireless communication standards and protocols, such as GPRS, UMTS, CDMA1900, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the client computing device 101A can communicate with various other entities using Unstructured Supplementary Service data (USSD), Short Message Service (SMS), Multimedia Messaging Service (MMS), Dual-Tone Multi-Frequency (DTMF) Signaling, Subscriber Identity Module Dialer (SIM dialer), and/or the like. The client computing device 101A can also download changes, add-ons, and updates, for instance, to its firmware, software (e.g., including executable instructions, applications, program modules), and operating system.

The client computing device 101A may also comprise a user interface comprising one or more user input/output interfaces (e.g., a display 216 and/or speaker/speaker driver coupled to a processor component 208 and a touch screen, keyboard, mouse, and/or microphone coupled to a processor component 208). For example, the user output interface may be configured to provide an application, browser, user interface, dashboard, webpage, and/or similar words used herein interchangeably executing on and/or accessible via the client computing device 101A to cause display or audible presentation of information/data and for user interaction therewith via one or more user input interfaces. The user output interface may be updated dynamically from communication with the remote computing server 105. The user input interface can comprise any of a number of devices allowing the client computing device 101A to receive data, such as a keypad 218 (hard or soft), a touch display, voice/speech or motion interfaces, scanners, readers, or other input device. In embodiments including a keypad 218, the keypad 218 can include (or cause display of) the conventional numeric (0-9) and related keys (#, *), and other keys used for operating the client computing device 101A and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the client computing device 101A can collect information/data, user interaction/input, and/or the like.

The client computing device 101A can also include volatile storage or memory 222 and/or non-volatile storage or memory 224, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the client computing device 101A-101N.

Figure 3:
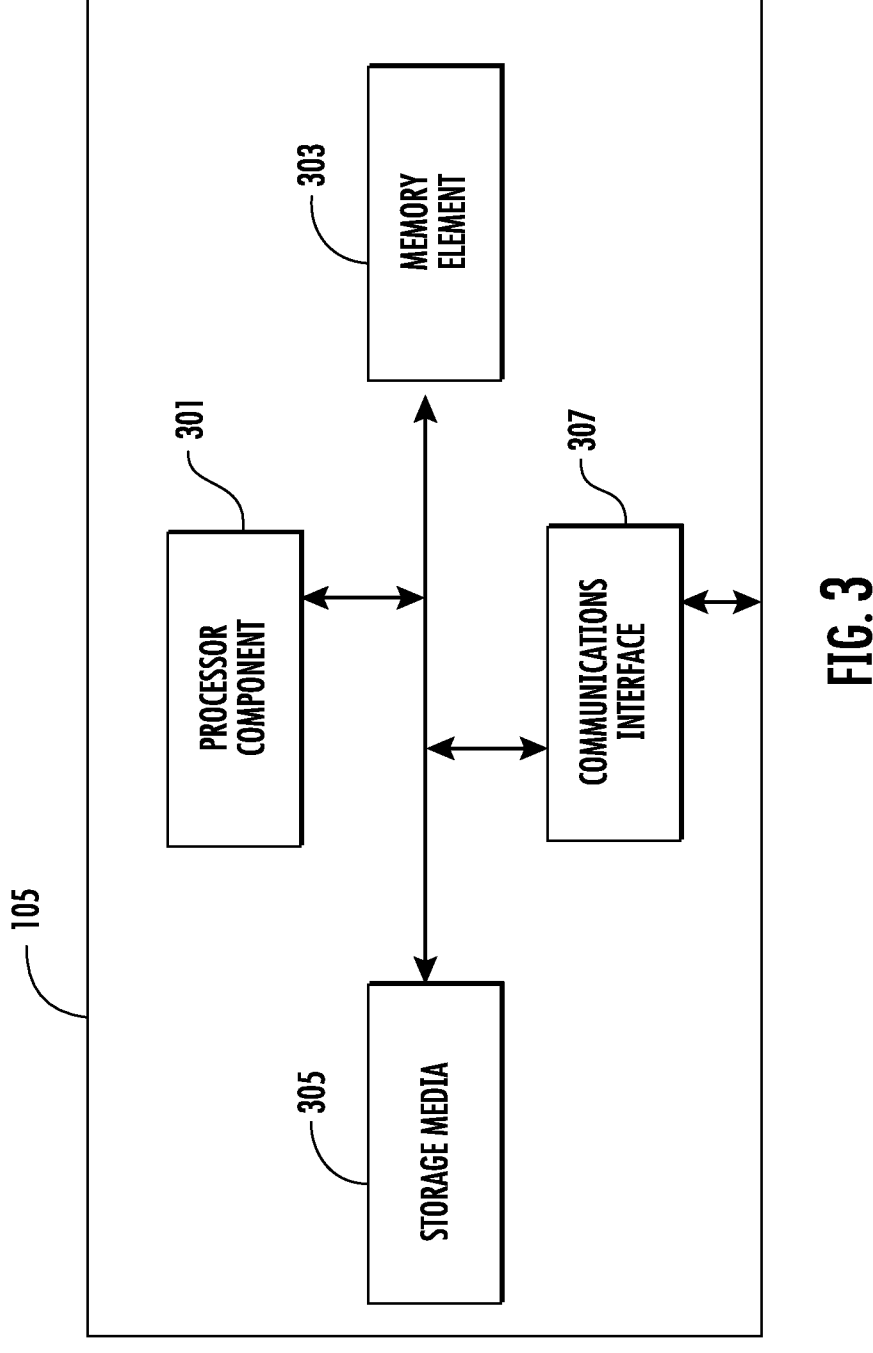
FIG. 3 illustrates an example schematic representation of an example remote computing server in an example remote computing platform in accordance with various embodiments of the present disclosure.

Referring now to FIG. 3, an example schematic representation of an example remote computing server 105 in an example remote computing platform in accordance with some example embodiments described herein. In some embodiments, the example remote computing platform may be a cloud computing platform, and the example remote computing server may be a cloud computing server.

As shown in FIG. 3, in one embodiment, the remote computing server 105 may include or be in communication with one or more processor components (for example, processor component 301) (also referred to as processor components, processing circuitry, and/or similar terms used herein interchangeably) that communicate with other elements within the remote computing server 105 via a bus, for example, or network connection. As will be understood, the processor component 301 may be embodied in a number of different ways. For example, the processor component 301 may be embodied as one or more complex programmable logic devices (CPLDs), microprocessor components, multi-core processor components, co-processing entities, application-specific instruction-set processor components (ASIPs), and/or controllers. Further, the processor component 301 may be embodied as one or more other processing devices or circuitry. The term circuitry may refer to an entirely hardware embodiment or a combination of hardware and computer program products. Thus, the processor component 301 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processor component 301 may be configured for a particular use or configured to execute instructions stored in volatile or non-volatile media or otherwise accessible to the processor component 301. As such, whether configured by hardware or computer program products, or by a combination thereof, the processor component 301 may be capable of performing steps or operations according to embodiments of the present disclosure when configured accordingly.

In one embodiment, the remote computing server 105 may further include or be in communication with volatile media (also referred to as volatile storage, memory, memory storage, memory circuitry and/or similar terms used herein interchangeably). In one embodiment, the volatile storage or memory may also include one or more memory element 303 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory element 303 may be used to store at least portions of the databases, database instances, database management system entities, data, applications, programs, program modules, scripts, source code, object code, byte code, compiled code, interpreted code, machine code, executable instructions, and/or the like being executed by, for example, the processor component 301 as shown in FIG. 3. Thus, the databases, database instances, database management system entities, data, applications, programs, program modules, scripts, source code, object code, byte code, compiled code, interpreted code, machine code, executable instructions, and/or the like may be used to control certain aspects of the operation of the remote computing server 105 with the assistance of the processor component 301 and operating system.

In one embodiment, the remote computing server 105 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or storage media 305 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or storage media 305 may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

Storage media 305 may also be embodied as a data storage device or devices, as a separate database server or servers, or as a combination of data storage devices and separate database servers. Further, in some embodiments, storage media 305 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third-party provider and where some or all of the information/data required for the operation of the recovery prediction system may be stored.

As indicated, in one embodiment, the remote computing server 105 may also include one or more network and/or communications interface 307 for communicating with various computing entities, such as by communicating data, content, information, and/or similar terms used herein interchangeably that can be transmitted, received, operated on, processed, displayed, stored, and/or the like. For instance, the remote computing server 105 may communicate with controller component 107, one or more client computing devices 101A . . . 101N, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the remote computing server 105 may be configured to communicate via wireless external communication networks using any of a variety of protocols, such as general packet radio service (GPRS), Universal Mobile Telecommunications System (UMTS), Code Division Multiple Access 1900 (CDMA1900), CDMA1900 1X (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), Institute of Electrical and Electronics Engineers (IEEE) 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The remote computing server 105 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the remote computing server's components may be located remotely from components of other remote computing servers, such as in a distributed system. Furthermore, one or more of the components may be aggregated and additional components performing functions described herein may be included in the remote computing server 105. Thus, the remote computing server 105 can be adapted to accommodate a variety of needs and circumstances.

Figure 4:
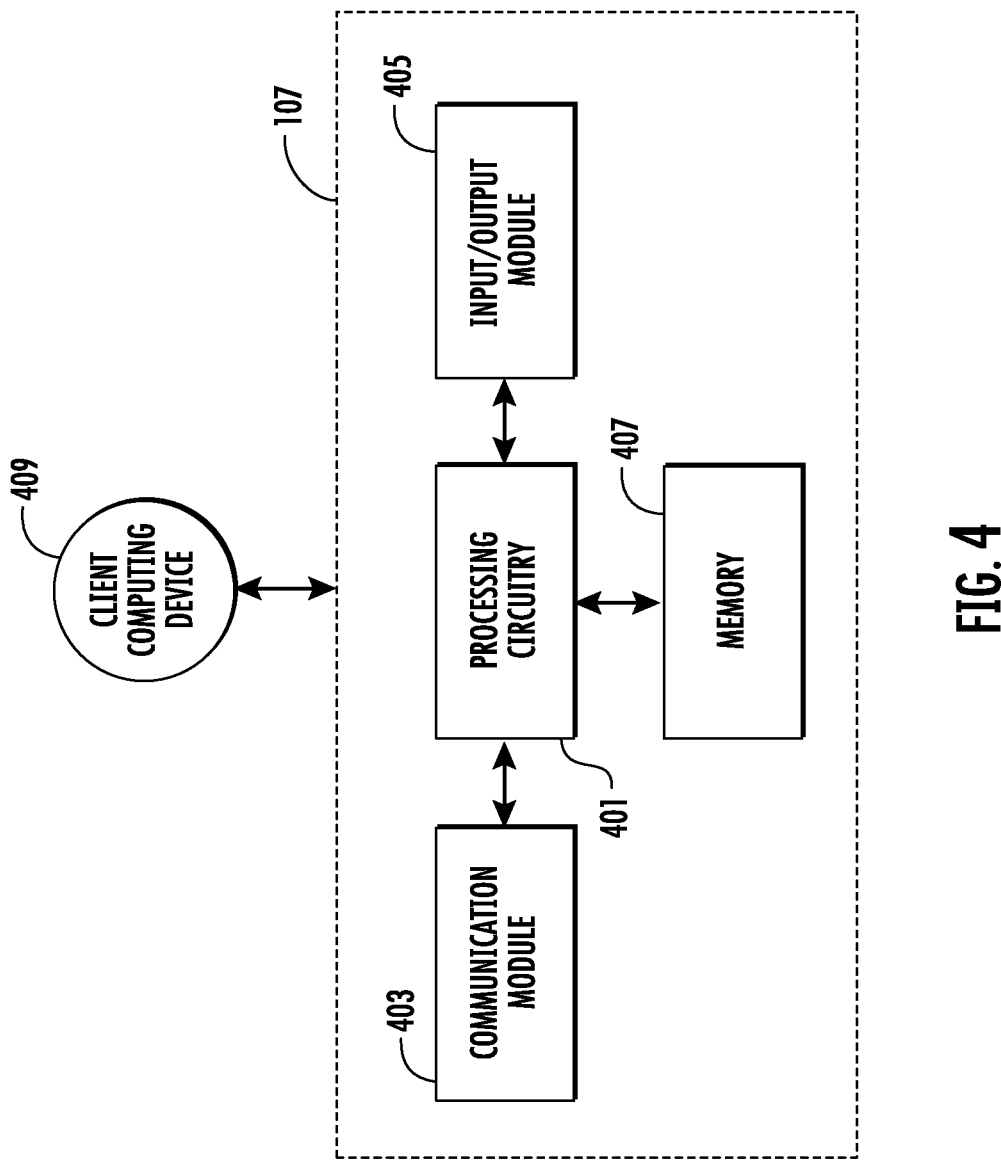
FIG. 4, a schematic diagram depicting an example controller component of an example system for deploying software update in accordance with various embodiments of the present disclosure.

Referring now to FIG. 4, a schematic diagram depicting an example controller component 107 of an example system for deploying software update in accordance with various embodiments of the present disclosure. As shown, the controller component 107 comprises processing circuitry 401, a communication module 403, input/output module 405, a memory 407 and/or other components configured to perform various operations, procedures, functions or the like described herein.

As shown, the controller component 107 (such as the processing circuitry 401, communication module 403, input/ output module 405 and memory 407) is electrically coupled to and/or in electronic communication with a client computing device 409. For example, the client computing device 409 may exchange (e.g., transmit and receive) data with the controller component 107.

The processing circuitry 401 may be implemented as, for example, various devices comprising one or a plurality of microprocessors with accompanying digital signal processors; one or a plurality of processors without accompanying digital signal processors; one or a plurality of coprocessors; one or a plurality of multi-core processors; one or a plurality of controllers; processing circuits; one or a plurality of computers; and various other processing elements (including integrated circuits, such as ASICs or FPGAs, or a certain combination thereof). In some embodiments, the processing circuitry 401 may comprise one or more processors. In one exemplary embodiment, the processing circuitry 401 is configured to execute instructions stored in the memory 407 or otherwise accessible by the processing circuitry 401. When executed by the processing circuitry 401, these instructions may enable the controller component 107 to execute one or a plurality of the functions as described herein. No matter whether it is configured by hardware, firmware/software methods, or a combination thereof, the processing circuitry 401 may comprise entities capable of executing operations according to the embodiments of the present invention when correspondingly configured. Therefore, for example, when the processing circuitry 401 is implemented as an ASIC, an FPGA, or the like, the processing circuitry 401 may comprise specially configured hardware for implementing one or a plurality of operations described herein. Alternatively, as another example, when the processing circuitry 401 is implemented as an actuator of instructions (such as those that may be stored in the memory 407), the instructions may specifically configure the processing circuitry 401 to execute one or a plurality of algorithms and operations described herein.

The memory 407 may comprise, for example, a volatile memory, a non-volatile memory, or a certain combination thereof. Although illustrated as a single memory in FIG. 4, the memory 407 may comprise a plurality of memory components. In various embodiments, the memory 407 may comprise, for example, a hard disk drive, a random-access memory, a cache memory, a flash memory, a Compact Disc Read-Only Memory (CD-ROM), a Digital Versatile Disk Read-Only Memory (DVD-ROM), an optical disk, a circuit configured to store information, or a certain combination thereof. The memory 407 may be configured to store information, data, application programs, instructions, and etc., so that the controller component 107 can execute various functions according to the embodiments of the present disclosure. For example, in at least some embodiments, the memory 407 is configured to cache input data for processing by the processing circuitry 401. Additionally, or alternatively, in at least some embodiments, the memory 407 is configured to store program instructions for execution by the processing circuitry 401. The memory 407 may store information in the form of static and/or dynamic information. When the functions are executed, the stored information may be stored and/or used by the controller component 107.

The communication module 403 may be implemented as any apparatus included in a circuit, hardware, a computer program product or a combination thereof, which is configured to receive and/or transmit data from/to another component or apparatus. The computer program product comprises computer-readable program instructions stored on a computer-readable medium (for example, the memory 407) and executed by a controller component 107 (for example, the processing circuitry 401). In some embodiments, the communication module 403 (as with other components discussed herein) may be at least partially implemented as the processing circuitry 401 or otherwise controlled by the processing circuitry 401. In this regard, the communication module 403 may communicate with the processing circuitry 401, for example, through a bus. The communication module 403 may comprise, for example, antennas, transmitters, receivers, transceivers, network interface cards and/or supporting hardware and/or firmware/software, and is used for establishing communication with another apparatus. The communication module 403 may be configured to receive and/or transmit any data that may be stored by the memory 407 by using any protocol that can be used for communication between apparatuses. The communication module 403 may additionally or alternatively communicate with the memory 407, the input/output module 405 and/or any other component of the controller component 107, for example, through a bus.

In some embodiments, the controller component 107 may comprise an input/output module 405. The input/output module 405 may communicate with the processing circuitry 401 to receive instructions input by the user and/or to provide audible, visual, mechanical or other outputs to the user. Therefore, the input/output module 405 may comprise supporting devices, such as a keyboard, a mouse, a display, a touch screen display, and/or other input/output mechanisms. Alternatively, at least some aspects of the input/ output module 405 may be implemented on a device used by the user to communicate with the controller component 107. The input/output module 405 may communicate with the memory 407, the communication module 403 and/or any other component, for example, through a bus. One or a plurality of input/output modules and/or other components may be included in the controller component 107.

Figure 5:
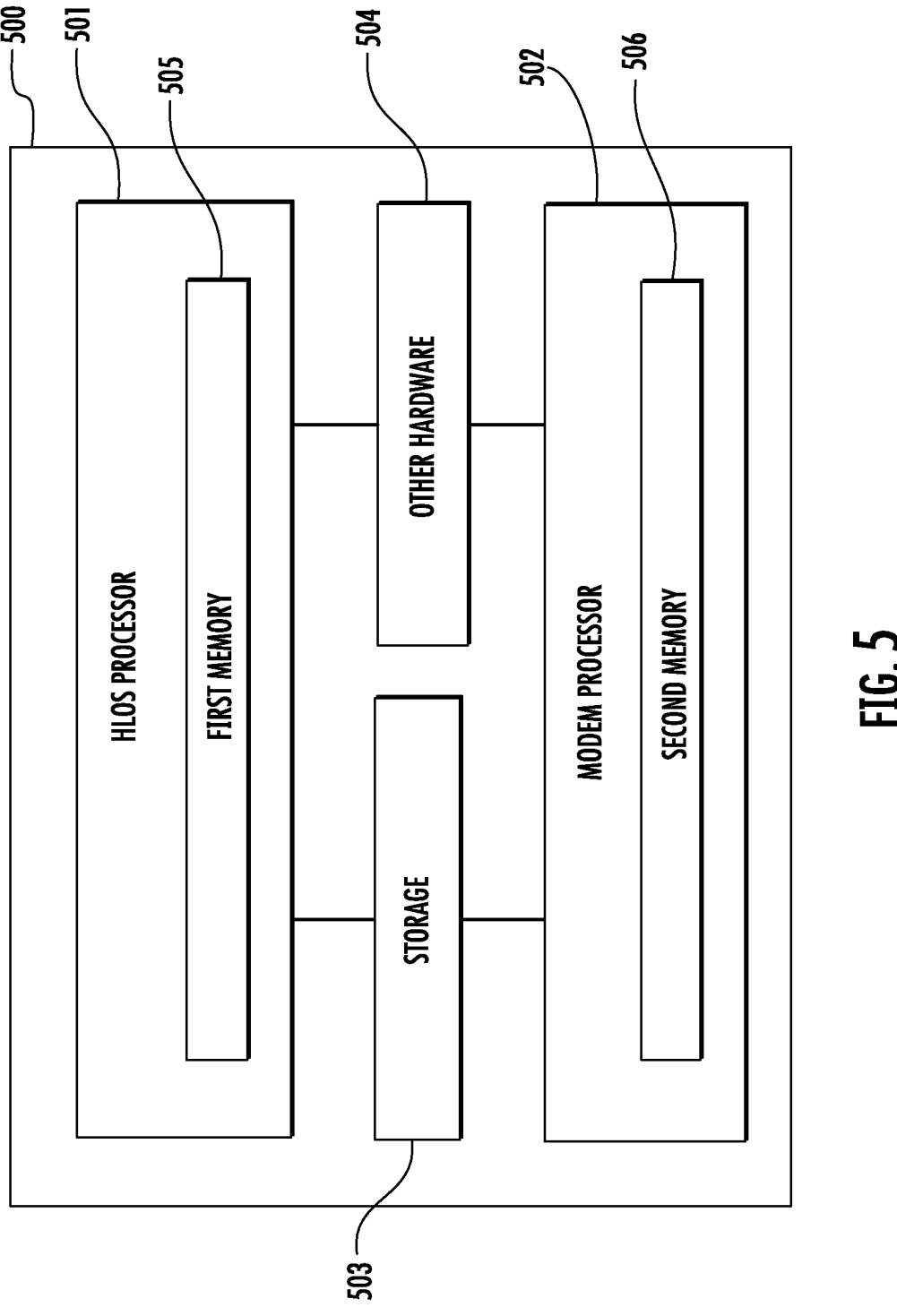
FIG. 5 illustrates an example schematic representation of an example client computing device in accordance with various embodiments of the present disclosure.

Referring now to FIG. 5, an example schematic representation of an example client computing device in accordance with some example embodiments described herein is provided. In some embodiments, as illustrated in FIG. 5, the client computing device 500 may include a HLOS processor 501, a modem processor 502, a storage 503, and other hardware 504.

In some embodiments, the HLOS processor may include a first memory 505. The modem processor 502 may include a second memory 506. The first memory 505 and the second memory 506 may provide storage functionality. The HLOS processor 501 and the modem processor 502 may provide processing functionality. Although the components are described with respect to functional limitations, it should be understood that the particular implementations necessarily include the use of particular hardware. It should also be understood that certain of the components described herein may include similar or common hardware.

The client computing device 500 may be capable of deploying a software update to the software stack when instructions stored in the first memory 505 and the second memory 506 are executed. In some embodiments, the software update may be a modem hotfix, a security fix, a patch, or the like. At least one of the first memory 505 and the second memory 506 may store instructions, and when the instructions are executed by the HLOS processor 501 or the modem processor 502, the system may be able to perform steps or operations according to embodiments of the present disclosure when configured accordingly. For example, the software stack may be a software stack for a modem of the client computing device 500.

In some embodiments, the storage 503 may be a volatile storage or a non-volatile storage. The storage 503 may be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like.

Figure 6:
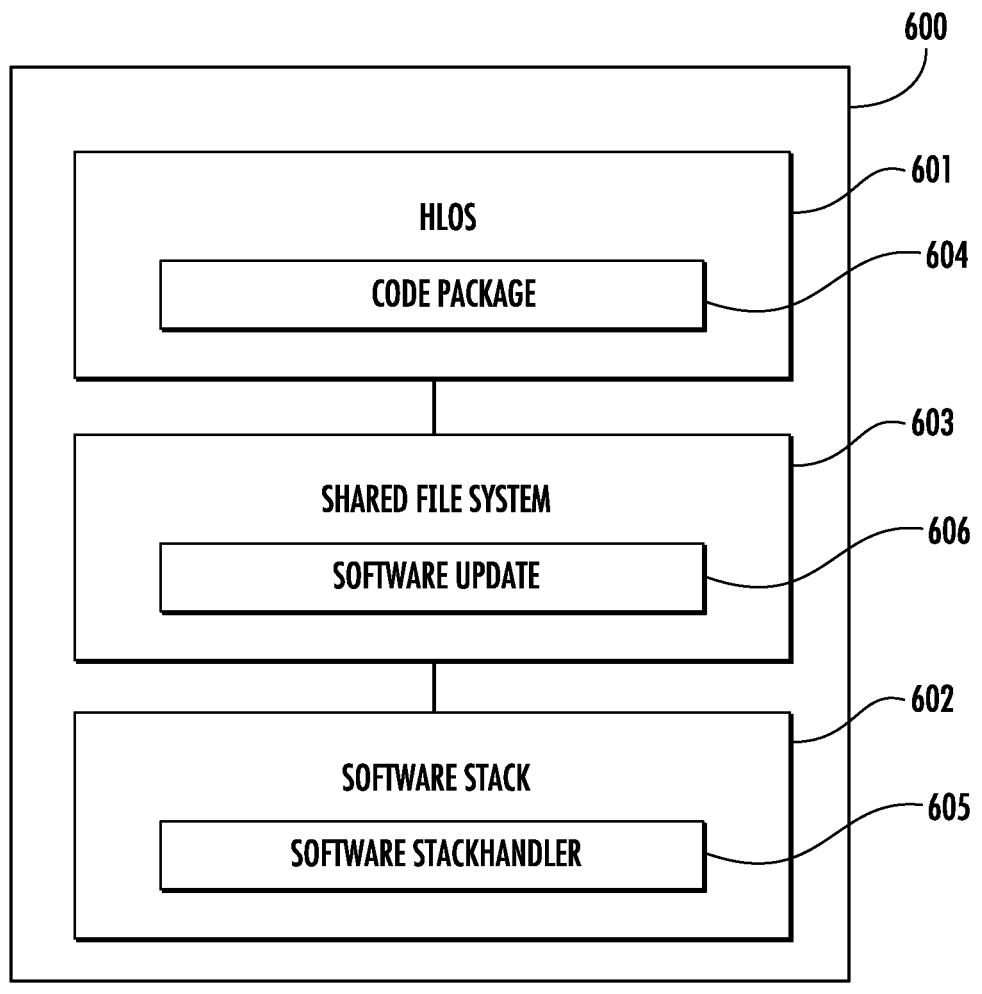
FIG. 6 illustrates a schematic diagram depicting an example Operating System of an example client computing device in accordance with various embodiments of the present disclosure.

Referring now to FIG. 6, a schematic diagram depicting an example Operating System 600 of an example client computing device in accordance with various embodiments of the present disclosure. As shown, the Operating System 600 includes a HLOS 601, a software stack 602, and a shared file system 603. The HLOS 601 and the software stack 602 may be electrically coupled to and/or in electronic communication with the shared file system 603. As depicted, the shared file system 603 may exchange (e.g., transmit and receive) data with the HLOS 601 and the software stack 602. The Operating System 600 is configured to be installed on the client computing device 500 to perform various operations, procedures, functions or the like described herein.

According to some embodiments, the HLOS 601 may include a code package 604, which may be instructed by the controller component 107 to communicate with the shared file system 603. In some examples, the code package 604 may be a modem Android Pony Express (APEX) module. In particular, APEX is a container format introduced in Android that is used in the install flow for lower-level system modules. This format facilitates the updates of system components that don't fit into the standard Android application model, in some examples. Some example components are native services and libraries, hardware abstraction layers (HALs), runtime (ART), and class libraries. The software stack 602 may include a software update handler 605 configured to communicate with the shared file system 603. In some examples, the software update handler 605 may be a hotfix handler, modem hotfix handler, a security fix handler, a patch handler, or the like.

According to some embodiments, the shared file system 603 may store a software update 606 when software update files are extracted and transmitted to the shared file system 603 by the code package 604. As is described herein, the software update 606, may comprise a code package, a hotfix, and/or the like. In some examples, the software update 606 may include the transmission of the code package 604 to the client computing device 500. In some examples, the code package 604 may enable the upgrade of low level modules of HLOS (e.g., native kernel libraries or framework java libraries). In some examples, the code package is native kernel libraries or Android framework java libraries.

In some embodiments, the shared file system 603 may store the software update 606 in the storage 503 of the client computing device 500.

In some embodiments, the code package 604 may be configured to maintain a list of software updates with different version numbers. The code package 604 may be further configured to extract files of the software update 606 to the shared file system 603. The code package 604 may be further configured to delete the files of the software update 606 that are no longer required by the Operating System 600.

In some embodiments, a file type of the files of the software update may be extensible markup language (XML). In some embodiments, a file type of the files of the software update may be JavaScript Object Notation (JSON).

In some embodiments, the software update 606 may include a name of a configuration, values of the configuration, and a type of the configuration. Each of the name, the values, and the type of the configuration may be respectively applied in the software stack 602 for a carrier or a radio access type network.

In some embodiments, the type of the configuration may be a persistent configuration. In some embodiments, the type of the configuration may be a runtime configuration.

In some embodiments, the software update handler 605 of the software stack 602 may read the software update 606 in the shared file system 603, write the persistent configuration to the software stack 602 as elastic file system (EFS) files or Non-Volatile File System (NVFS) files.

In some embodiments, the software update handler 605 of the software stack 602 may be configured to start after the shared file system 603 and a modem file system are started.

In some embodiments, the software update handler 605 of the software stack 602 may be configured to start before the corresponding wireless wide area network (WWAN) protocol stacks of the Operating System 600 is started.

In some embodiments, the software update handler 605 of the software stack 602 may be controlled by a modem to manage the software stack on the modem. In some embodiments, the modem includes the modem processor 502 associated with the second memory 506 and the software stack 602 associated with the software update handler 605.

Figure 7:
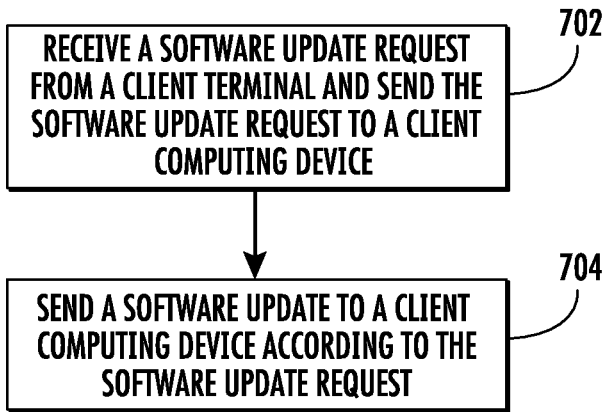
FIG. 7 illustrates an example flow diagram of an exemplary method to deploy the software update to the client computing device by an exemplary controller component in accordance with various embodiments of the present disclosure.

FIG. 7 illustrate example flowcharts of the operations performed by an apparatus, such as a controller component 107, in accordance with example embodiments of the present disclosure. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present disclosure and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block (s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 7, 8, and 9 when executed, convert a computer or processing circuitry into a particular machine configured to perform an example embodiment of the present disclosure. Accordingly, the operations of FIGS. 7, 8, and 9 define an algorithm for configuring a computer or processor, to perform an example embodiment. In some cases, a general purpose computer may be provided with an instance of the processor which performs the algorithm of FIGS. 7, 8, and 9 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

Referring now to FIG. 7, an example flow diagram of an exemplary method 700 is illustrated to deploy the software update to the client computing device by an exemplary controller component, such as controller component 107. The example method 700 may be executed by a computing device associated with a controller component including processing circuitry and memory (for example, as illustrated and described above in connection with at least FIG. 1). For example, the controller component 107 may instruct processing circuitry to execute an instruction stored in a memory 407, to implement the function specified in the flowchart of FIG. 7.

At block 702, the controller component receives a software update request from a remote computing server 105 to update software of the client computing device. As an example, the controller component may access, receive and/or transmit any data by using any protocol that can be used for communication between the controller component and the client computing device. As an example, the remote computing server 105 may be a server provided by a manufacturer of the client computing device 500.

In some embodiments, the software update request may be issued when a major incident needs to be resolved or a security patch needs to be implemented. In some embodiments, the software update request may be an urgent request, which must be introduced as soon as possible. In some embodiments, the software update request may be a request to update the firmware of a modem.

In some embodiments and at block 704, the controller component may send the software update to the client computing device or otherwise permit access by the client computing device according to the software update request. For example, the controller component 107 may communicate with the client computing device and send the software update to the client computing device.

Figure 8:
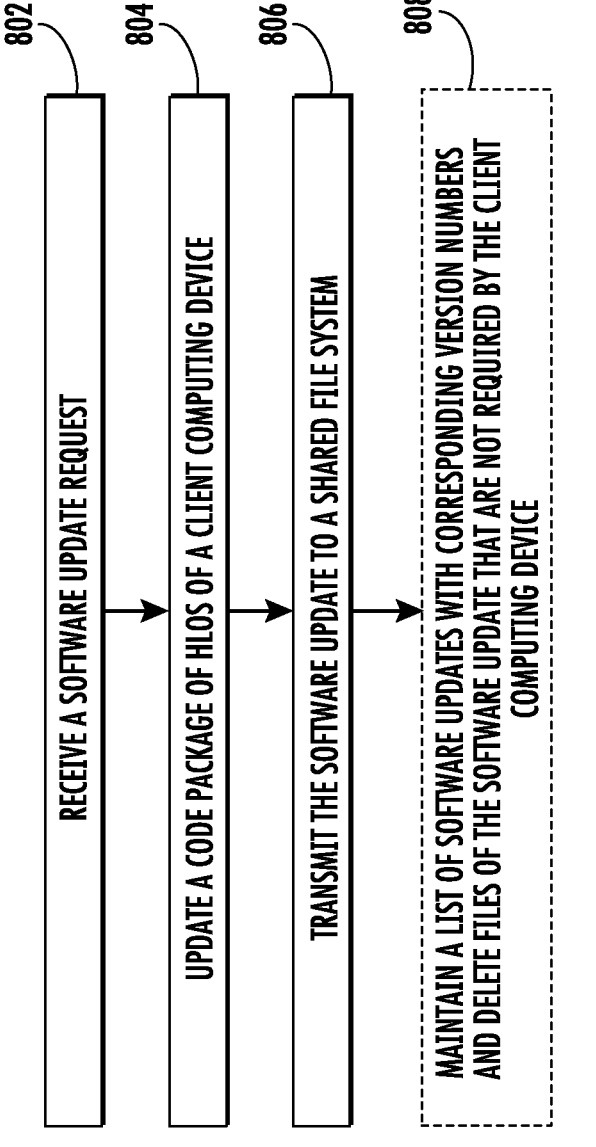
FIG. 8 illustrates an example flow diagram of an exemplary method for deploying the software update to the software stack in accordance with various embodiments of the present disclosure.

Referring now to FIG. 8, an example flow diagram of an exemplary method 800 is an example of a method for deploying the software update 606 to the software stack 602 of a modem processor. The example method 800 may be executed by the HLOS processor 501 as illustrated and described above in connection with at least FIG. 5. For example, the HLOS processor 501 may execute an instruction stored in a storage memory, such as the first memory 505 to implement the functions specified in the flowchart of FIG. 8. For example, the method 800 may be executed by a native or class library, pre-compiled code that can be called by apps, Hardware Abstraction Layers (HAL), and the Run-time (ART). In some examples, the method may use the APEX feature of the Android.

At block 802, the HLOS processor 501 receives or otherwise accesses a software update request from a controller component to update software of the client computing device. In particular, the HLOS processor 501 may execute an instruction stored on the first memory 505 to receive or otherwise access the software update request from the controller component to update software of the HLOS processor 501. As an example, the HLOS processor 501 may receive and/or transmit any data by using a protocol that can be used for communication between the controller component and the client computing device. For example, the software update request may be a software update request in the form of a hotfix, a security fix, a patch, or the like. In some examples, the software update request may be a request to update the firmware of the modem.

In some embodiments and at block 804, the HLOS processor 501 may cause the code package 604 in the high-level Operating System (HLOS) 601 to update the code package 604 in response to receiving the software update request. For example, the HLOS processor 501 may execute the instruction stored on the first memory 505 to update the code package 604 in the HLOS.

In some embodiments, the code package 604 may be a modem APEX module in HLOS 601.

In some embodiments, to update the code package of the HLOS processor 501, the HLOS processor 501 receives an update of the code package of the HLOS and modify the code package of the HLOS 601 according to the update of the code package.

In some embodiments and at block 806, the HLOS processor 501 may cause the code package 604 to transmit or otherwise provide the software update 606 to the shared file system 603. In particular, the software update may be transmitted or otherwise provided to the shared file system 603 by the communication interface 207. For example, the shared file system 603 is shared between the HLOS 601 of the Operating System 600 and the software stack 602 of the Operating System 600. In some embodiments, the step of transmitting the software update 606 to the shared file system 603 may include extracting files of the software update 606 to the shared file system 603. As is explained in FIG. 9, the software update is configured to cause the modem processor to deploy the software update to the software stack of the modem processor in an instance in which a file change is detected in the shared file system.

In some embodiments and at block 808, the HLOS processor 501 may further instruct the code package 604 to maintain a list of software updates with different version numbers and delete the files of the software update 606 that are no longer required by the Operating System 600.

Figure 9:
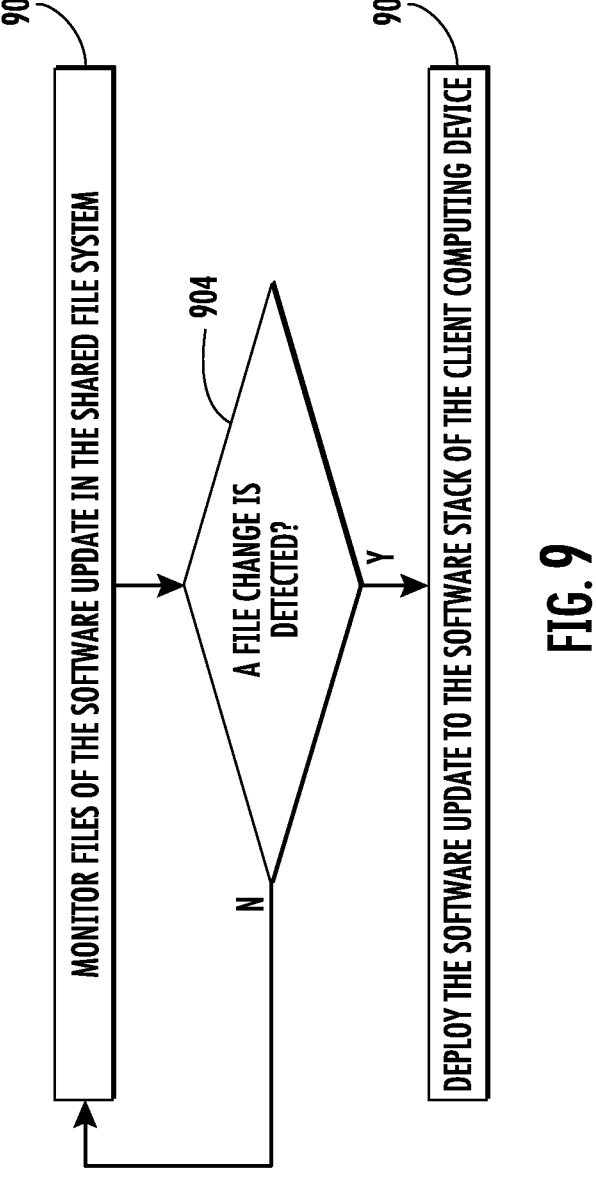
FIG. 9 illustrates an example flow diagram of an exemplary method for deploying the software update to the software stack in accordance with various embodiments of the present disclosure.

Referring now to FIG. 9, an example flow diagram of an exemplary method 900 is an example of a method for deploying the software update 606 to the software stack 602 of the modem processor 502. The example method 900 may be executed by the modem processor 502 as illustrated and described above in connection with at least FIG. 5. For example, modem processor 502 may execute an instruction stored in a storage memory, such as the second memory 506 to implement the functions specified in the flowchart of FIG. 9. For example, the method 900 may be executed by a native or class library, pre-compiled code that can be called by apps, Hardware Abstraction Layers (HAL), and the Runtime (ART).

In some embodiments and at block 902, the modem processor 502 may cause the software stack handler 605 to monitor files in the shared file system 603. In particular, the modem processor 502 may execute an instruction stored on the second memory 506 to cause the software stack handler 605 to monitor files in the shared file system 603. For example, the software stack handler 605 may track any file changes in the shared file system 603. In particular, the file changes in the shared file system 603 may be monitored in real time by default. In some embodiments, the software stack handler 605 may track any changes in a particular folder of the shared file system 603. As is described in FIG. 8, the shared file system is shared between a high-level operating system (HLOS) processor and a software stack of the modem processor, and the HLOS processor is configured to transmit, by a code package of the HLOS processor, a software update to the shared file system in an instance in which a code package of the HLOS processor is updated.

In some embodiments, the file change detected in the shared file system 603 may include a change of the name of the configuration, a change of the values of the configuration, and a change of the type of the configuration.

In some embodiments, the shared file system is encrypted. For example, the shared file system may not be accessed by the client or any third-party applications.

In some embodiments and at block 904, the modem processor 502 may instruct the software stack handler 605 of the modem processor 502 to determine whether a file change is detected in the shared file system. In particular, the modem processor 502 may execute the instruction stored on the second memory 506 to instruct the software stack handler 605 to determine whether a file change is detected in the shared file system. In some embodiments, if the software stack handler 605 determines that a file change is detected at block 904, the example method proceeds to block 906, where the software update 606 may be deployed to the software stack 602 of the modem processor 502. In some embodiments, if the software stack handler 605 determines that a file change is not detected at block 904, the example method proceeds to block 902, where the software stack handler 605 continues to monitor files in the shared file system 603.

In some embodiments, the step of deploying the software update to the software stack of the modem processor 502 may include instructing the software update handler 605 of the software stack 602 to read the software update 606 from the shared file system 603, and applying the name of the configuration and the values of the configuration to a corresponding protocol stack of the software stack 602. For example, the modem processor 502 may execute an instruction to update the firmware of the modem based on the detected file change on the shared file system 603.

As described above, when an urgent upgrade to the modem, such as an upgrade on the whole modem firmware, is needed, the controller component may send a software update request to the client computing device. The controller component may further instruct a code package (e.g. APEX)

of the HLOS to be developed and runs in the HLOS of the client computing device. A software stack may be upgraded with the help of the code package feature without a complete Operating System reinstallation. In addition, a new software thread will also be introduced inside the modem. The new software thread will monitor the file changes in a shared file system, which is shared between the HLOS and the software stack. When the software update is extracted to the shared filed system, the software update files will be monitored by the software stack. Upton detecting a file change, such as a change of the name of the configuration, a change of the values of the configuration, and a change of the type of the configuration in the shared file system, the software update will be deployed and applied to the software stack. The new configurations from the software update files will take effect immediately or at the next power cycle while the HLOS is maintained stable.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for deploying a software update by a high-level operating system (HLOS) processor, comprising:

receiving, by the HLOS processor, a software update request;

updating a code package of the HLOS processor;

transmitting, by the code package, the software update to a shared file system, wherein the shared file system is shared between the HLOS processor and a software stack of a modem processor;

maintaining, by the code package, a list of software updates with corresponding version numbers, wherein the software update is configured to cause the modem processor to deploy the software update to the software stack of the modem processor in an instance in which a file change is detected in the shared file system; and deleting files of the software update that are not required by the modem processor.

2. The method of claim 1, wherein updating the code package of the HLOS processor includes:

receiving an update of the code package of the HLOS processor; and modifying the code package of the HLOS processor according to the update of the code package.

3. The method of claim 1, wherein the software update includes a name of a configuration, values of the configuration, and a type of the configuration to be applied in the software stack for a carrier or a radio access type network, and wherein the file change in the shared file system includes a change of the name of the configuration, a change of the values of the configuration, and a change of the type of the configuration.

4. The method of claim 3, wherein the type of the configuration is a persistent configuration or a runtime configuration.

5. The method of claim 3, wherein to deploy the software update to the software stack of the modem processor, the software stack of the modem processor is caused to:

read, by a software update handler of the modem processor, the software update from the shared file system; and apply the name of the configuration, the values of the configuration, and the type of the configuration to a corresponding protocol stack of the software stack.

6. The method of claim 5, wherein the software update handler is configured to start after the shared file system is started and before the software stack of the modem processor is started.

7. The method of claim 1, wherein the software update request is a request for a firmware update.

8. The method of claim 1, wherein:

a file type of files of the software update is extensible markup language (XML) or JavaScript Object Notation (JSON).

9. A method for deploying a software update by a modem processor, comprising:

monitoring files of the software update in a shared file system, wherein the shared file system is shared between a high-level operating system (HLOS) processor and a software stack of the modem processor;

transmitting, by a code package of the HLOS processor, the software update in the shared file system in an instance in which the code package of the HLOS processor is updated;

maintaining, by the code package, a list of software updates with corresponding version numbers;

determining whether a file change is detected in the shared file system;

deploying the software update to the software stack of the modem processor in an instance in which the file change is detected in the shared file system; and deleting files of the software update that are not required by the modem processor.

10. The method of claim 9, wherein the software update includes a name of a configuration, values of the configuration, and a type of the configuration to be applied in the software stack for a carrier or a radio access type network, and wherein the file change in the shared file system includes a change of the name of the configuration, a change of the values of the configuration, and a change of the type of the configuration.

11. The method of claim 10, wherein the type of the configuration is a persistent configuration or a runtime configuration.

12. The method of claim 10, wherein deploying the software update to the software stack of the modem processor includes:

reading, by a software update handler of the modem processor, the software update from the shared file system; and applying the name of the configuration, the values of the configuration, and the type of the configuration to a corresponding protocol stack of the software stack.

13. The method of claim 12, wherein the software update handler is configured to start after the shared file system is started and before the software stack of the modem processor is started.

14. A computing device for deploying a software update to the computing device, a client computing device comprising a high-level operating system (HLOS) processor and a memory storing instructions, when the instructions are executed, the HLOS processor is configured to:

receive, by the HLOS processor, a software update request;

update a code package of the HLOS processor;

transmit, by the code package, the software update to a shared file system, wherein the shared file system is shared between the HLOS processor and a software stack of a modem processor;

maintain, by the code package, a list of software updates with corresponding version numbers, wherein the modem processor is configured to cause the software stack of the modem processor to deploy the software update to the software stack of the modem processor in an instance in which a file change is detected in the shared file system; and delete files of the software update that are not required by the modem processor.

15. The computing device of claim 14, wherein to update the code package of the HLOS processor, the HLOS processor is configured to:

receive an update of the code package of the HLOS processor; and modify the code package of the HLOS processor according to the update of the code package.

16. The computing device of claim 14, wherein the software update includes a name of a configuration, values of the configuration, and a type of the configuration to be applied in the software stack for a carrier or a radio access type network, and wherein the file change in the shared file system includes a change of the name of the configuration, a change of the values of the configuration, and a change of the type of the configuration.

17. The computing device of claim 16, wherein the type of the configuration is a persistent configuration or a runtime configuration.

18. The computing device of claim 16, wherein to deploy the software update to the software stack of the modem processor, the modem processor is configured to:

read, by a software update handler of the modem processor, the software update from the shared file system; and apply the name of the configuration, the values of the configuration, and the type of the configuration to a corresponding protocol stack of the software stack.

19. The computing device of claim 18, wherein the software update handler is configured to start after the shared file system is started and before the software stack of the modem processor is started.

* * * * *